United States Patent [19]

Vanmaele

[11] Patent Number: 5,391,536
[45] Date of Patent: Feb. 21, 1995

[54] OXALYLAMINO SUBSTITUTED INDOANILINE DYES FOR USE IN THERMAL SUBLIMATION TRANSFER PRINTING

[75] Inventor: Luc Vanmaele, Lochristi, Belgium

[73] Assignee: AGFA-Gevaert N.V., Mortsel, Belgium

[21] Appl. No.: 267,465

[22] Filed: Jun. 28, 1994

[30] Foreign Application Priority Data

Jul. 8, 1993 [EP] European Pat. Off. ............ 93202000

[51] Int. Cl.$^6$ ...................... B41M 5/035; B41M 5/38
[52] U.S. Cl. ................................. 503/227; 428/195; 428/913; 428/914
[58] Field of Search ............... 8/471; 428/195, 913, 428/914; 503/227; 552/302

[56] References Cited

U.S. PATENT DOCUMENTS

| | | | |
|---|---|---|---|
| 4,816,435 | 3/1989 | Murata et al. | 503/227 |
| 4,829,047 | 5/1989 | Niwa et al. | 503/227 |
| 4,975,409 | 12/1990 | Mikoshiba et al. | 503/227 |

FOREIGN PATENT DOCUMENTS

| | | | |
|---|---|---|---|
| 1312536 | 12/1989 | Japan | 430/564 |

OTHER PUBLICATIONS

English language abstract of JP-A-1 312 536.

*Primary Examiner*—B. Hamilton Hess
*Attorney, Agent, or Firm*—Brumbaugh, Graves, Donohue & Raymond

[57] ABSTRACT

The present invention provides a dye-donor element for use according to thermal dye sublimation transfer, said dye-donor element comprising a support provided with a dye layer containing a dye and a polymeric binder, characterized in that said dye corresponds to the following formula:

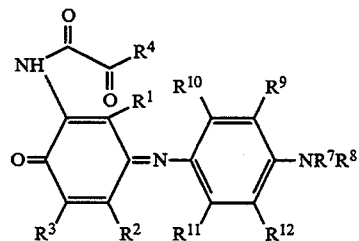

wherein $R^1$ to $R^{12}$ are as set out in the claims and the description.

5 Claims, No Drawings

OXALYLAMINO SUBSTITUTED INDOANILINE DYES FOR USE IN THERMAL SUBLIMATION TRANSFER PRINTING

DESCRIPTION

1. Field of the Invention

The present invention relates to dye-donor elements for use according to thermal dye sublimation transfer and to novel dyes for use in said dye-donor elements.

2. Background of the Invention

Thermal dye sublimation transfer is a recording method in which a dye-donor element provided with a dye layer containing sublimable dyes having heat transferability is brought into contact with a receiver sheet or receiver element and selectively, in accordance with a pattern information signal, is heated by means of a thermal printing head provided with a plurality of juxtaposed heat-generating resistors, whereby dye is transferred from the selectively heated regions of the dye-donor element to the receiver sheet and forms a pattern thereon, the shape and density of which are in accordance with the pattern and intensity of heat applied to the dye-donor element.

A dye-donor element for use according to thermal dye sublimation transfer usually comprises a very thin support e.g. a polyester support, one side of which is covered with a dye layer comprising the printing dyes. Usually, an adhesive or subbing layer is provided between the support and the dye layer. Normally, the opposite side is covered with a slipping layer that provides a lubricated surface against which the thermal printing head can pass without suffering abrasion. An adhesive layer may be provided between the support and the slipping layer.

The dye layer can be a monochromic dye layer or it may comprise sequential repeating areas of differently coloured dyes e.g. dyes having a cyan, magenta, yellow, and optionally black hue. When a dye-donor element containing three or more primary colour dyes is used, a multicolour image can be obtained by sequentially performing the dye transfer process steps for each colour.

A primary coloured dye layer e.g. a magenta or cyan or yellow dye layer may comprise only one primary coloured dye (a magenta, cyan or yellow dye respectively) or may comprise a mixture of two or more primary colour dyes of the same hue (two magenta, two cyan or two yellow dyes respectively).

Any dye can be used in such a dye layer provided it is easily transferable to the dye-image-receiving layer of the receiver sheet or element by the action of heat.

Typical and specific examples of dyes for use in thermal dye sublimation transfer have been described in e.g. EP 209,990, EP 209,991, EP 216,483, EP 218,397, EP 227,095, EP 227,096, EP 229,374, EP 235,939, EP 247,737, EP 257,577, EP 257,580, EP 258,856, EP 279,330, EP 279,467, EP 285,665, U.S. Pat. No. 4,743,582, U.S. Pat. No. 4,753,922, U.S. Pat. No. 4,753,923, U.S. Pat. No. 4,757,046, U.S. Pat. No. 4,769,360, U.S. Pat. No. 4,771,035, U.S. Pat. No. 5,026,677, JP 84/78,894, JP 84/78,895, JP 84/78,896, JP 84/227,490, JP 84/227,948, JP 85/27,594, JP 85/30,391, JP 85/229,787, JP 85/229,789, JP 85/229,790, JP 85/229,791, JP 85/229,792, JP 85/229,793, JP 85/229,795, JP 86/41,596, JP 86/268,493, JP 86/268,494, JP 86/268,495, and JP 86/284,489.

In spite of the many dyes that already exist, there is still a continuous search for novel dyes and especially for dyes that are suited for use in dye-donor elements for thermal dye sublimation transfer printing, preferably dyes with low melting points and a good solubility in ecologically acceptable solvents.

SUMMARY OF THE INVENTION

It is therefore an object of the present invention to provide novel dye-donor elements for use according to thermal dye sublimation transfer printing.

It is another object of the present invention to provide novel dyes that can be used in said dye-donor elements.

It is another object of the present invention to provide novel dyes which have a high solubility in ecologically acceptable solvents and which have low melting points.

Further objects of the present invention will become clear from the description hereinafter.

According to the present invention there is provided a dye-donor element for use according to thermal dye sublimation transfer, said dye-donor element comprising a support provided with a dye layer containing a dye and a polymeric binder, characterized in that said dye corresponds to the following formula (I):

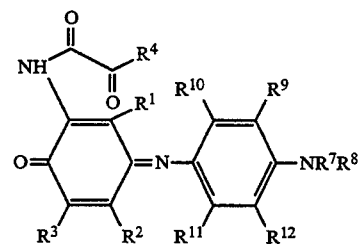

wherein:
$R^1$, $R^2$ and $R^3$ each independently represents hydrogen, halogen, nitro, an alkyl group, a cycloalkyl group, an aryl group, an allyl group, an alkoxy group, an aryloxy group, an alkylthio group, an arylthio group, an acylamino group, an amino group, CN, a carboalkoxy group, a sulfonylamino group, a carbonamido group, which groups may be substituted, or $R^2$ and $R^3$ together with the atoms to which they are attached represent the necessary atoms to form a ring;

$R^4$ represents $OR^5$, $SR^5$, $NR^5R^6$ or a heterocyclic ring, $R^5$ and $R^6$ each independently represents hydrogen, an alkyl group, an allyl group, an aryl group, a cycloalkyl group, an alkenyl group, a heterocyclic ring or $R^5$ and $R^6$ together with the atoms to which they are attached represent the necessary atoms to form a heterocyclic ring;

$R^7$ and $R^8$ each independently represents hydrogen, an alkyl group, an aryl group, a heterocyclic group, or $R^7$ and $R^8$ together with the atoms to which they are attached represent the necessary atoms to form a heterocyclic ring, or $R^7$ or $R^8$ together with $R^9$ or $R^{12}$ together with the atoms to which they are attached represent the necessary atoms to form a ring;

$R^9$, $R^{10}$, $R^{11}$ and $R^{12}$ each independently represents hydrogen, hydroxy, halogen, an alkyl group, a cycloalkyl group, an aryl group, an amino group, an alkyloxy group, an aryloxy group, a carbamoyl group, a sulfamoyl group, NH—$SO_2R^{13}$, NH—

COR$^{13}$, O—SO$_2$R$^{13}$, O—COR$^{13}$, or R$^9$ and R$^{10}$ or R$^{11}$ and R$^{12}$ together with the atoms to which they are attached represent the necessary atoms to form a ring;

R$^{13}$ represents an alkyl group, a cycloalkyl group, an alkenyl group, an aralkyl group, an aryl group, an alkyloxy group, an aryloxy group, an alkylthio group, an arylthio group, an amino group or a heterocyclic group.

According to the present invention there are provided novel dyes according to the above general formula (I).

According to the present invention there is further provided a method for making an image according to the thermal dye transfer process comprising the steps of:

placing the dye layer of a dye donor element as defined above in face-to-face relationship with an dye-image receiving layer of a receiver sheet;

image-wise heating a thus obtained assemblage and separating said receiver sheet from said dye donor element.

DETAILED DESCRIPTION OF THE INVENTION

Preferably R$^1$ represents hydrogen, R$^2$ represents hydrogen or acylamino, or akoxy or an alkyl group, or an alkylthio group or an alkylcarbonamido group, or a dialkylamino group, R$^3$ represents hydrogen or halogen, R$^4$ represents an alkoxy group, an alkylthio group, a dialkylamino group, a monoalkylamino group, an aryloxy group, an arylthio group, a heterocyclic ring e.g. piperidyl, pyrrolidinyl, morfolinyl, furyl, thienyl, R$^7$ and R$^8$ both represent an alkyl group, R$^9$ represents hydrogen, R$^{10}$ represents hydrogen, an alkoxy group, an amino group, or an alkyl group, R$^{11}$ represents hydrogen or an alkyl group and R$^{12}$ represents hydrogen.

Representatives of novel dyes corresponding to general formula (I) are listed in Table 1 and 2 hereinafter.

TABLE 1

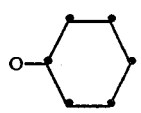

| Dye | R$^7$ | R$^8$ | R$^{10}$ | R$^{11}$ | R$^2$ | R$^3$ | R$^4$ |
|---|---|---|---|---|---|---|---|
| 1 | C$_2$H$_5$ | C$_2$H$_5$ | H | H | H | H | OC$_2$H$_5$ |
| 2 | C$_2$H$_5$ | C$_2$H$_5$ | H | H | H | H | OCH$_3$ |
| 3 | C$_2$H$_5$ | C$_2$H$_5$ | H | H | H | H | OCH(CH$_3$)$_2$ |
| 4 | C$_2$H$_5$ | C$_2$H$_5$ | H | H | H | H | OCH$_2$CH(CH$_3$)$_2$ |
| 5 | C$_2$H$_5$ | C$_2$H$_5$ | H | H | H | H | OCH(CH$_3$)C$_2$H$_5$ |
| 6 | C$_2$H$_5$ | C$_2$H$_5$ | H | H | H | H | OC$_3$H$_7$ |
| 7 | C$_2$H$_5$ | C$_2$H$_5$ | H | H | H | H | OC$_4$H$_9$ |
| 8 | C$_2$H$_5$ | C$_2$H$_5$ | H | H | H | H | OC(CH$_3$)$_3$ |
| 9 | C$_2$H$_5$ | C$_2$H$_5$ | H | H | H | H | OCH$_2$CH$_2$OCH$_3$ |
| 10 | C$_2$H$_5$ | C$_2$H$_5$ | H | H | H | H | O(CH$_2$CH$_2$O)$_2$CH$_3$ |
| 11 | C$_2$H$_5$ | C$_2$H$_5$ | H | H | H | H | 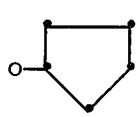 |
| 12 | C$_2$H$_5$ | C$_2$H$_5$ | H | H | H | H | 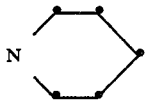 |
| 13 | C$_2$H$_5$ | C$_2$H$_5$ | H | H | H | H | OC$_6$H$_5$ |
| 14 | C$_2$H$_5$ | C$_2$H$_5$ | H | H | H | H | SC$_6$H$_5$ |
| 15 | C$_2$H$_5$ | C$_2$H$_5$ | H | H | H | H | SCH$_3$ |
| 16 | C$_2$H$_5$ | C$_2$H$_5$ | B | H | H | H | SC$_3$H$_7$ |
| 17 | C$_2$H$_5$ | C$_2$H$_5$ | H | H | H | H | 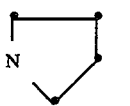 |
| 18 | C$_2$H$_5$ | C$_2$H$_5$ | H | H | H | H |  |
| 19 | C$_2$H$_5$ | C$_2$H$_5$ | H | H | H | H | N(C$_2$H$_5$)$_2$ |
| 20 | C$_2$H$_5$ | C$_2$H$_5$ | H | H | H | H | N(C$_3$H$_7$)$_2$ |

TABLE 1-continued

[Structure: 2,5-cyclohexadien-1-one with NH-C(=O)-C(=O)-R⁴ at position 5, =N-aryl at position 4, R² and R³ substituents; the N-aryl bears R¹⁰, R¹¹, and NR⁷R⁸ groups]

| Dye | R⁷ | R⁸ | R¹⁰ | R¹¹ | R² | R³ | R⁴ |
|-----|----|----|-----|-----|----|----|----|
| 21 | $C_2H_5$ | $C_2H_5$ | H | H | H | H | $N(CH_3)C_6H_5$ |
| 22 | $C_2H_5$ | $C_2H_5$ | H | H | H | H | morpholino (N–O 6-ring) |
| 23 | $C_2H_5$ | $C_2H_5$ | H | H | H | H | $NH-C_6H_5$ |
| 24 | $C_2H_5$ | $C_2H_5$ | H | H | H | H | $NH-CH_3$ |
| 25 | $C_2H_5$ | $C_2H_5$ | H | H | H | H | $NHC_3H_7$ |
| 26 | $C_2H_5$ | $C_2H_5$ | H | H | H | H | $NHCH(CH_3)_2$ |
| 27 | $C_2H_5$ | $C_2H_5$ | H | H | H | H | $N(CH_3)(C_6H_5)$ (N-methylanilino) |
| 28 | $C_2H_5$ | $C_2H_5$ | H | H | H | H | 2-furyl* (O-containing 5-ring) |
| 29 | $C_2H_5$ | $C_2H_5$ | $CH_3$ | H | H | H | $OC_2H_5$ |
| 30 | $C_2H_5$ | $C_2H_5$ | $CH_3$ | H | H | H | $OCH_3$ |
| 31 | $C_2H_5$ | $C_2H_5$ | $CH_3$ | H | H | H | $OCH(CH_3)C_2H_5$ |
| 32 | $C_2H_5$ | $C_2H_5$ | $CH_3$ | H | H | H | $OCH(CH_3)CH_2OCH_3$ |
| 33 | $C_2H_5$ | $C_2H_5$ | $CH_3$ | H | H | H | $OCH_2CH_2OCH_3$ |
| 34 | $C_2H_5$ | $C_2H_5$ | $CH_3$ | H | H | H | $SC_6H_5$ |
| 35 | $C_2H_5$ | $C_2H_5$ | $CH_3$ | H | H | H | $SCH_3$ |
| 36 | $C_2H_5$ | $C_2H_5$ | $CH_3$ | H | H | H | morpholino (N–O 6-ring) |
| 37 | $C_2H_5$ | $C_2H_5$ | $CH_3$ | H | H | H | pyrrolidino (N 5-ring) |
| 38 | $C_2H_5$ | $C_2H_5$ | $CH_3$ | H | H | H | $N(C_2H_5)_2$ |
| 39 | $C_2H_5$ | $C_2H_5$ | $CH_3$ | H | H | H | $NHC_3H_7$ |
| 40 | $C_2H_5$ | $C_2H_5$ | $CH_3$ | H | H | H | $OCH(CH_3)_2$ |
| 41 | $C_2H_5$ | $C_2H_5$ | $CH_3$ | $CH_3$ | H | H | $OC_2H_5$ |
| 42 | $C_2H_5$ | $C_2H_5$ | $CH_3$ | $CH_3$ | H | H | $OCH(CH_3)_2$ |
| 43 | $C_2H_5$ | $C_2H_5$ | $CH_3$ | $CH_3$ | H | R | $OCH(CH_3)C_2H_5$ |
| 44 | $C_2H_5$ | $C_2H_5$ | $CH_3$ | $CH_3$ | H | H | morpholino (N–O 6-ring) |
| 45 | $C_2H_5$ | $C_2H_5$ | $CH_3$ | $CH_3$ | H | H | piperidino (N 6-ring) |

TABLE 1-continued

| Dye | R$^7$ | R$^8$ | R$^{10}$ | R$^{11}$ | R$^2$ | R$^3$ | R$^4$ |
|---|---|---|---|---|---|---|---|
| 46 | C$_2$H$_5$ | C$_2$H$_5$ | CH$_3$ | CH$_3$ | H | H | NHC$_3$H$_7$ |
| 47 | C$_2$H$_5$ | C$_2$H$_5$ | CH$_3$ | CH$_3$ | H | H | SC$_6$H$_5$ |
| 48 | C$_2$H$_5$ | C$_2$H$_5$ | CH$_3$ | CH$_3$ | H | H | NHCH$_3$ |
| 49 | C$_2$H$_5$ | C$_2$H$_5$ | CH$_3$ | CH$_3$ | H | H | N(C$_3$H$_7$)$_2$ |
| 50 | C$_2$H$_5$ | C$_2$H$_5$ | CH$_3$ | CH$_3$ | H | H | N(CH$_3$)C$_6$H$_5$ |
| 51 | C$_2$H$_5$ | C$_2$H$_5$ | H | H | CH$_3$ | Cl | OC$_2$H$_5$ |
| 52 | C$_2$H$_5$ | C$_2$H$_5$ | H | H | CH$_3$ | Cl | OCH(CH$_3$)$_2$ |
| 53 | C$_2$H$_5$ | C$_2$H$_5$ | H | H | CH$_3$ | Cl | N(C$_3$H$_7$)$_2$ |
| 54 | C$_2$H$_5$ | C$_2$H$_5$ | H | H | C$_2$H$_5$ | Cl | OC$_2$H$_5$ |
| 55 | C$_2$H$_4$OAc | C$_2$H$_5$ | H | H | H | H | OC$_2$H$_5$ |
| 56 | C$_2$H$_4$CN | C$_2$H$_4$CN | H | H | H | H | OC$_2$H$_5$ |
| 57 | C$_2$H$_5$ | C$_2$H$_5$ | H | H | H | H | OC$_2$H$_5$ |
| 58 | C$_2$H$_5$ | C$_2$H$_5$ | NHAC | H | H | H | OC$_2$H$_5$ |
| 59 | C$_2$H$_5$ | C$_2$H$_5$ | OCH$_3$ | H | H | H | OCH(CH$_3$)CH$_2$OCH$_3$ |
| 60 | CH$_3$ | CH$_3$ | H | H | H | H | OCH$_3$ |
| 61 | CH$_3$ | CH$_3$ | H | H | H | H | morpholino (N–O ring) |
| 62 | CH$_3$ | CH$_3$ | H | H | H | H | piperidino (N ring) |
| 63 | CH$_3$ | CH$_3$ | H | H | H | H | N(C$_2$H$_5$)$_2$ |
| 64 | CH$_3$ | CH$_3$ | H | H | H | H | SC$_3$H$_7$ |
| 65 | CH$_3$ | CH$_3$ | H | H | H | H | SC$_6$H$_5$ |
| 66 | CH$_3$ | CH$_3$ | H | H | H | H | OCH$_2$CH(CH$_3$)$_2$ |
| 67 | CH$_3$ | CH$_3$ | H | H | H | H | OCH(CH$_3$)$_2$ |
| 68 | CH$_3$ | CH$_3$ | H | H | H | H | OC$_4$H$_9$ |
| 69 | CH$_3$ | CH$_3$ | H | H | H | H | OCH(CH$_3$)C$_2$H$_5$ |
| 70 | CH$_3$ | CH$_3$ | H | H | H | H | N(C$_3$H$_7$)$_2$ |
| 71 | CH$_3$ | CH$_3$ | H | H | H | H | N(CH$_3$)$_2$ |
| 72 | CH$_3$ | CH$_3$ | H | H | H | H | OC$_3$H$_7$ |
| 73 | CH$_3$ | CH$_3$ | H | H | H | H | NHC$_3$H$_7$ |
| 74 | CH$_3$ | CH$_3$ | H | H | H | H | OC$_2$H$_5$ |
| 75 | C$_2$H$_5$ | C$_2$H$_5$ | N(CH$_3$)$_2$ | H | H | H | OC$_2$H$_5$ |
| 76 | C$_2$H$_5$ | C$_2$H$_5$ | H | H | H | H | SCH(CH$_3$)$_2$ |
| 77 | C$_2$H$_5$ | C$_2$H$_5$ | CH$_3$ | H | H | H | SCH(CH$_3$)$_2$ |
| 78 | CH$_3$ | CH$_3$ | H | H | H | H | SCH(CH$_3$)$_2$ |
| 79 | C$_2$H$_5$ | C$_2$H$_5$ | CH$_3$ | H | H | H | SC$_3$H$_7$ |
| 80 | C$_2$H$_5$ | C$_2$H$_5$ | H | H | CH$_3$ | Cl | SC$_3$H$_7$ |
| 81 | C$_2$H$_5$ | C$_2$H$_5$ | CH$_3$ | H | H | H | CH$_2$CH(CH$_3$)$_2$ |
| 82 | C$_2$H$_5$ | C$_2$H$_5$ | H | H | H | H | NHC$_6$H$_4$(pN(CH$_3$)$_2$) |
| 83 | C$_2$H$_5$ | C$_2$H$_5$ | H | H | NHCOCH$_3$ | H | OC$_2$H$_5$ |
| 84 | C$_2$H$_5$ | C$_2$H$_5$ | CH$_3$ | H | NHCOCH$_3$ | H | OC$_2$H$_5$ |
| 85 | C$_2$H$_5$ | C$_2$H$_5$ | H | H | NHCOCH$_3$ | H | N(C$_2$H$_5$)$_2$ |
| 86 | C$_2$H$_5$ | C$_2$H$_5$ | CH$_3$ | H | NHCOCH$_3$ | H | N(C$_2$H$_5$)$_2$ |

*indicates the bonding position if such is not clear from the valences of the atoms of the substituent.

TABLE 2

| Dye | |
|---|---|
| [structure: naphthoquinone with NH-C(O)-C(O)-OC$_2$H$_5$ group and =N-C$_6$H$_4$-N(C$_2$H$_5$)$_2$] | 87 |
| [structure: naphthoquinone with NH-C(O)-C(O)-OC$_2$H$_5$ group and =N-(methyl-substituted phenyl)-N(C$_2$H$_5$)$_2$] | 88 |
| [structure: quinone with NH-C(O)-C(O)-OC$_2$H$_5$ group and =N-tetrahydroquinoline] | 89 |
| [structure: quinone with NH-C(O)-C(O)-O-CH(CH$_3$)$_2$ group and =N-tetrahydroquinoline] | 90 |
| [structure: quinone with NH-C(O)-C(O)-OC$_2$H$_5$ group and =N-phenyl-N(CH$_3$)-(CH$_2$-CH=C(CH$_3$)-)] | 91 |

Dyes according to the present invention can be obtained by the oxidative coupling method known in the art between p-phenylenediamine compounds or p-nitrosoaniline compounds and the appropriate phenols.

Representative examples of suitable p-phenylenediamine compounds are: 4-N,N-dimethylamino aniline, 4-N,N-diethylamino aniline, 4-(N-ethyl, N-hydroxyethyl) amino aniline, 4-(N-ethyl, N-cyanomethyl) amino aniline, 4-(N-ethyl,N-ethylsulfonic acid) amino aniline, 2-methyl, 4-(N,N-dihydroxyethyl) amino aniline, 2-methyl, 4-(N,N-diethylacetate) amino aniline, 2,6-dimethyl, 4-(N,N-dihydroxyethyl) amino aniline, 2,3,5,6-tetramethyl-4-N,N-diethylamino aniline, 4-piperidino aniline, 4-morpholino aniline, 4-pyrrolidyl aniline, 4-imidazolo aniline.

Dyes according to general formula (I) above show a cyan hue or absorb in the infrared region.

These dyes can be used as cyan image-forming dyes for silver halide color photographic materials by utilizing the above coupling reaction whereby the dye is imagewise formed according to the process of silver halide color photography. Also, these dyes are useful as cyan filter dyes for silver halide color photographic materials and also as antihalation dyes. Further after functionalization with hydrophilic groups these dyes can be used in inkjet printing. The dyes can also be used in resistive ribbon printing, in inks e.g. for laser applications, in textile, in lacquers and in paints. They can also be used for transfer printing on fabrics and for constructing filter array elements.

According to a preferred embodiment of this invention these dyes are used as cyan dyes or IR-dyes in the dye layer of a dye-donor element for thermal dye sublimation transfer.

These dyes can also be used as IR-absorbing dyes in the dye layer of a dye-donor element for laser induced thermal transfer, provided the absorption maximum is above 700 nm.

The dye layer of the dye-donor element is formed preferably by adding the dyes, the polymeric binder medium, and other optional components to a suitable solvent or solvent mixture, dissolving or dispersing the ingredients to form a coating composition that is applied to a support, which may have been provided first with an adhesive or subbing layer, and dried.

The dye layer thus formed generally has a thickness of about 0.2 to 5.0 $\mu$m, preferably 0.4 to 2.0 $\mu$m, and the amount ratio of dye to binder is generally between 9:1 and 1:3 by weight, preferably between 2:1 and 1:2 by weight.

As polymeric binder the following can be used: cellulose derivatives, such as ethyl cellulose, hydroxyethyl cellulose, ethylhydroxy cellulose, ethylhydroxyethyl cellulose, hydroxypropyl cellulose, methyl cellulose, cellulose nitrate, cellulose acetate formate, cellulose acetate hydrogen phthalate, cellulose acetate, cellulose acetate propionate, cellulose acetate butyrate, cellulose acetate pentanoate, cellulose acetate benzoate, cellulose triacetate; vinyl-type resins and derivatives, such as polyvinyl alcohol, polyvinyl acetate, polyvinyl butyral, copolyvinyl butyral-vinyl acetal-vinyl alcohol, polyvinyl pyrrolidone, polyvinyl acetoacetal, polyacrylamide; polymers and copolymers derived from acrylates and acrylate derivatives, such as polyacrylic acid, polymethyl methacrylate and styrene-acrylate copolymers; polyester resins; polycarbonates; copolystyrene-acrylonitrile; polysulfones; polyphenylene oxide; organosilicones, such as polysiloxanes; epoxy resins and natural resins, such as gum arabic. Preferably, the binder for the dye layer of the present invention comprises cellulose acetate butyrate of copolystyrene-acrylonitrile.

Tye dyes in accordance with the present invention may be used in admixture with other known dyes for thermal sublimation printing. In particular they can be used in combination with tricyano- and dicyanovinyl dyes as disclosed in EP 92203566, EP 92203208 and with malononitrile dimer derived dyes as disclosed in EP-A-400706. The present dyes may also be used in admixture with azo dyes e.g. disperse azo dyes, anthraquinone dyes, indoaniline dyes, azomethine dyes. Examples of dyes that can be used in combination with the dyes of the present invention are disclosed in E.G. EP 92203979, EP 209,990, EP 209,991, EP 216,483, EP 218,397, EP 227,095, EP 227,096, EP 229,374, EP 235,939, EP 247,737, EP 257,577, EP 257,580, EP 258,856, EP 279,330, EP 279,467, EP 285,665, U.S. Pat. No. 4,743,582, U.S. Pat. No. 4,753,922, U.S. Pat. No. 4,753,923, U.S. Pat. No. 4,757,046, U.S. Pat. No. 4,769,360, U.S. Pat. No. 4,771,035, U.S. Pat. No. 5,026,677, JP 84/78,894, JP 84/78,895, JP 84/78,896, JP 84/227,490, JP 84/227,948, JP 85/27,594, JP 85/30,391, JP 85/229,787, JP 85/229,789, JP 85/229,790, JP 85/229,791, JP 85/229,792, JP 85/229,793, JP 85/229,795, JP 86/41,596, JP 86/268,493, JP 86/268,494, JP 86/268,495, and JP 86/284,489, U.S. Pat. No. 4,839,336, U.S. Pat. No. 5,168,094, U.S. Pat. No. 5,147,844, U.S. Pat. No. 5,177,052, U.S. Pat. No. 5,175,069, U.S. Pat. No. 5,155,088, U.S. Pat. No. 5,166,124, U.S. Pat. No. 5,166,129, U.S. Pat. No. 5,166,128, U.S. Pat. No. 5,134,115, U.S. Pat. No. 5,132,276, U.S. Pat. No. 5,132,275, U.S. Pat. No. 5,132,274, U.S. Pat. No. 5,132,273, U.S. Pat. No. 5,132,268, U.S. Pat. No. 5,132,267, U.S. Pat. No. 5,126,314, U.S. Pat. No. 5,126,313, U.S. Pat. No. 5,126,312, U.S. Pat. No. 5,126,311, U.S. Pat. No. 5,134,116, U.S. Pat. No. 4,975,410, U.S. Pat. No. 4,885,272, U.S. Pat. No. 4,886,029, etc.

The coating layer may also contain other additives, such as curing agents, preservatives, organic or inorganic fine particles, dispersing agents, antistatic agents, defoaming agents, viscosity-controlling agents, these and other ingredients have been described more fully in EP 133,011, EP 133,012, EP 111,004, and EP 279,467.

Any material can be used as the support for the dye-donor element provided it is dimensionally stable and capable of withstanding the temperatures involved, up to 400° C. over a period of up to 20 msec, and is yet thin enough to transmit heat applied on one side through to the dye on the other side to effect transfer to the receiver sheet within such short periods, typically from 1 to 10 msec. Such materials include polyesters such as polyethylene terephthalate, polyamides, polyacrylates, polycarbonates, cellulose esters, fluorinated polymers, polyethers, polyacetals, polyolefins, polyimides, glassine paper and condenser paper. Preference is given to a support comprising polyethylene terephthalate. In general, the support has a thickness of 2 to 30 μm. The support may also be coated with an adhesive or subbing layer, if desired.

The dye layer of the dye-donor element may be coated on the support or printed thereon by a printing technique such as a gravure process.

A dye barrier layer comprising a hydrophilic polymer may also be employed between the support and the dye layer of the dye-donor element to enhance the dye transfer densities by preventing wrong-way transfer of dye backwards to the support. The dye barrier layer may contain any hydrophilic material that is useful for the intended purpose. In general, good results have been obtained with gelatin, polyacrylamide, polyisopropyl acrylamide, butyl methacrylate-grafted gelatin, ethyl methacrylate-grafted gelatin, ethyl acrlate-grafted gelatin, cellulose monoacetate, methylcellulose, polyvinyl alcohol, polyethyleneimine, polyacrylic acid, a mixture of polyvinyl alcohol and polyvinyl acetate, a mixture of polyvinyl alcohol and polyacrylic acid, or a mixture of cellulose monoacetate and polyacrylic acid. Suitable dye barrier layers have been described in e.g. EP 227091 and EP 228065. Certain hydrophilic polymers, for example those described in EP 227091, also have an adequate adhesion to the support and the dye layer, thus eliminating the need for a separate adhesive or subbing layer. These particular hydrophilic polymers used in a single layer in the donor element thus perform a dual function, hence are referred to as dye-barrier/subbing layers.

Preferably the reverse side of the dye-donor element can be coated with a slipping layer to prevent the printing head from sticking to the dye-donor element. Such a slipping layer would comprise a lubricating material such as a surface active agent, a liquid lubricant, a solid lubricant or mixtures thereof, with or without a polymeric binder. The surface active agents may be any agents known in the art such as carboxylates, sulfonates, phosphates, aliphatic amine salts, aliphatic quaternary ammonium salts, polyoxyethylene alkyl ethers, polyethylene glycol fatty acid esters, fluoroalkyl $C_2$–$C_{20}$ aliphatic acids. Examples of liquid lubricants include silicone oils, synthetic oils, saturated hydrocarbons and glycols. Examples of solid lubricants include various higher alcohols such as stearyl alcohol, fatty acids and fatty acid esters. Suitable slipping layers are described in e.g. EP 138483, EP 227090, U.S. Pat. No. 4,567,113, U.S. Pat. No. 4,572,860, U.S. Pat. No. 4,717,711.

The support for the receiver sheet that is used with the dye-donor element may be a transparent film of e.g. polyethylene terephthalate, a polyether sulfone, a polyimide, a cellulose ester or a polyvinyl alcohol-co-acetal. The support may also be a reflective one such as baryta-coated paper, polyethylene-coated paper or white polyester i.e. white-pigmented polyester.

To avoid poor adsorption of the transferred dye to the support of the receiver sheet this support must be coated with a special surface, a dye-image-receiving layer, into which the dye can diffuse more readily. The dye-image-receiving layer may comprise, for example, a polycarbonate, a polyurethane, a polyester, a polyamide, polyvinyl chloride, polystyrene-co-acrylonitrile, polycaprolactone or mixtures thereof. The dye-image receiving layer may also comprise a heat-cured product of poly(vinylchloride-co-vinylacetate-co-vinylalcohol. Suitable dye-receiving layers have been described in e.g. EP 133011, EP 133012, EP 144247, EP 227094, EP 228066.

In order to improve the light resistance and other stabilities of recorded images, UV absorbers, singlet oxygen quenchers such as HALS-compounds (Hindered Amine Light Stabilizers), a metal complex of the dye, e.g. a Ni or Cs complex, and/or antioxidants may be incorporated into the receiving layer.

The dye layer of the dye-donor element or the dye-image-receiving layer of the receiver sheet may also contain a releasing agent that aids in separating the dye-donor element from the dye-receiving element after transfer. The releasing agents can also be applied in a separate layer on at least part of the dye layer or of the receiving layer. For the releasing agent solid waxes, fluorine- or phosphate-containing surfactants and silicone oils are used. Suitable releasing agents are described in e.g. EP 133012, JP 85/19138, EP 227092.

The dye-donor elements according to the invention are used to form a dye transfer image. Such a process comprises placing the dye layer of the donor element in face-to-face relation with the dye-receiving layer of the receiver sheet and imagewise heating a thus obtained assemblage preferably from the back of the donor element. The transfer of the dye is accomplished e.g. by heating for about several milliseconds, typically between 10 ms to 40 ms, at a temperature of 400° C.

When the process is performed for but one single color, a monochrome cyan dye transfer image is obtained, which consists of at least one dye according to the present invention. A multi-color image can be obtained by using a donor element containing three or more primary color dyes, one of which consists of at least one cyan dye according to the present invention, and sequentially performing the process steps described above for each color. After the first dye has been transferred, the elements are peeled apart. A second dye-donor element (or another area of the donor element with a different dye area) is then brought in register with the dye-receiving element and the process is repeated. The third color and optionally further colors are obtained in the same manner.

In addition to thermal heads, laser light, infrared flash or heated pens can be used as the heat source for supplying heat energy. Thermal printing heads that can be used to transfer dye from the dye-donor elements of the present invention to a receiver sheet are commercially available. In case laser light is used (i.e. a method known as laser induced thermal transfer), the dye layer or another layer of the dye element has to contain a compound that absorbs the light emitted by the laser and converts it into heat, e.g. an IR-absorbing dye according to the present invention.

Alternatively, the support of the dye-donor element may be an electrically resistive ribbon consisting of, for example, a multi-layer structure of a carbon loaded polycarbonate coated with a thin aluminum film. Current is injected into the resistive ribbon by electrically addressing a print head electrode resulting in highly localized heating of the ribbon beneath the relevant electrode. The fact that in this case the heat is generated directly in the resistive ribbon and that it is thus the ribbon that gets hot leads to an inherent advantage in printing speed using the resistive ribbon/electrode head technology compared to the thermal head technology where the various elements of the thermal head get hot and must cool down before the head can move to the next printing position.

The following examples are provided to illustrate the invention in more detail without limiting, however, the scope thereof.

EXAMPLE 1

Synthesis of Dye 1

Dye 1 was prepared according to scheme 1.

Scheme 1

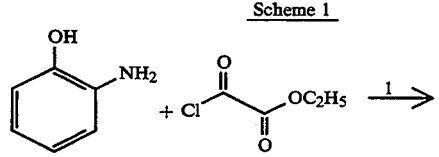

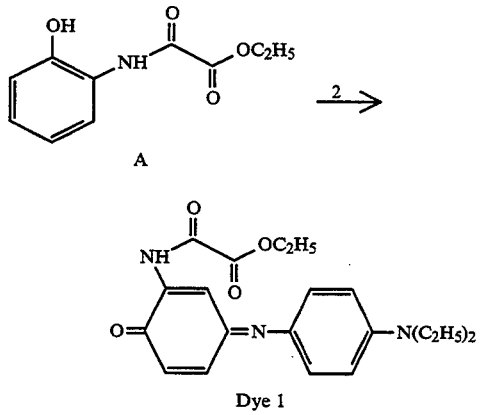

65.4 g (0.6 mole) of ortho-aminophenol was dissolved in 425 ml of acetone. 55.5 g (0.66 mole) of sodium bicarbonate was added. 70.4 ml (0.63 mole) of ethyl oxalyl chloride were added dropwise to the suspension while maintaining the temperature $\geq 40°$ C. The reaction mixture was stirred for one hour and poured into 1.5 l of water. The precipitate was filtered, washed with water and dried at 50° C. 113 g (90%) of compound A was obtained. 20.9 g (0.1 mole) of compound A was dissolved in 800 ml of ethyl acetate and 200 ml of ethanol (solution 1). 22 g (0.11 mole) of 4-diethylamino-aniline hydrochloride and 41 g (0.49 mole) of sodium bicarbonate were suspended in 100 ml of water and added to solution 1. A solution of 132 g (0.4 mole) of $K_3Fe(CN)_6$ in 400 ml of water was added to solution 1 and stirring was continued for one hour. The organic layer was washed twice with water, dried over sodium sulphate and concentrated under reduced pressure. The residue was purified by column chromatography ($CH_2Cl_2$/EtOAc; 9/1) to obtain 18.5 g (50%) of dye 1 (m.p. 98° C.).

EXAMPLE 2

All other dyes from table 1 and 2 were prepared analogously. Oxalyl chloride derivatives which are not commercially available can be prepared in situ according to methods known to those who are skilled in the art of organic synthesis. By way of example the preparation of dye 4 is described. Dye 4 was prepared according to scheme 2. Compound C was transformed into the corresponding dye 4 as described in example 1, scheme 1, step 2.

Scheme 2

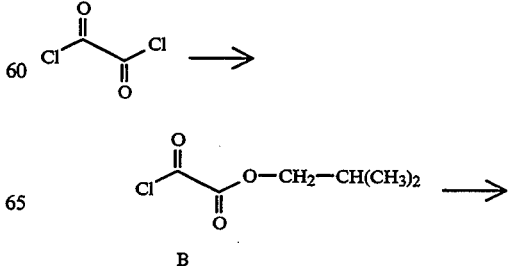

-continued
Scheme 2

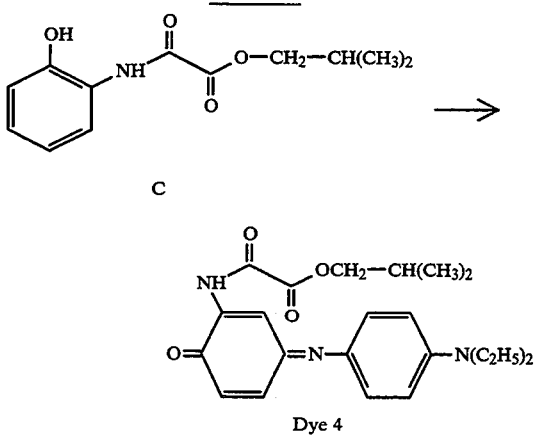

Dye 4

15.5 ml (0.21 mole) of i.BuOH dissolved in 150 ml of dichloromethane was added over 90 minutes at −5° C. to a solution of 18.3 ml (0.21 mole) of oxalyl chloride in 100 ml of dichloromethane. The solution was stirred at room temperature for 90 minutes. Then the solution of compound B was added to a mixture of 21.8 g (0.2 mole) of o-aminophenol and 35.3 g (0.42 mole) of sodium bicarbonate in 100 ml of dichloromethane at 20° C. The reaction mixture was stirred for one hour at 40° C. Dichloromethane was removed under reduced pressure and the residue was treated with a mixture of 0.5 l ice-water, 5 ml acetic acid and 25 ml of methanol. The precipitate was filtered, washed with water and methanol and dried to obtain 44.5 g of compound C (m.p. 160° C.: liquifies, solidifies again and decomposes above 230° C.).

EXAMPLE 3

Synthesis of Dye 22

Dye 22 was prepared according to scheme 3; the synthesis of dye 22 from compound D is analogous to step 2, scheme 1, example 1.

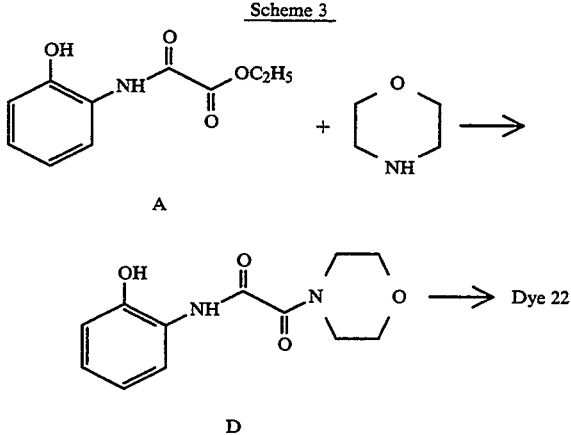

10.5 g (0.05 mole) of compound A was suspended in 9.0 ml of morpholine and heated to 45° C. for 30 minutes. The reaction mixture was poured into a mixture of 15 ml 1N HCl, 25 g of ice and 16 ml of methanol and stirred vigourously for one hour. The precipitate was filtered, washed with water and with a methanol/water mixture. After drying, 11.1 g of compound D are obtained (m.p. 125° C.; liquifies).

EXAMPLE 4

Synthesis of Dye 25

Dye 25 was prepared using 2-(n-propylamino-oxalylamino)phenol (compound E). The synthesis of dye 25 from compound E is analogous to step 2, scheme 1, example 1.

Synthesis of Compound E 10.5 g (0.05 mole) of compound A were added portionwise to 20 ml of n-propylamine while cooling with an ice bath (exothermic reaction). The resulting mixture was stirred for one hour at 40° C. and poured into a mixture of 25 g of ice and 50 ml 1N HCl. 10 ml of methanol was added and the precipitate was stirred for 15 minutes. The precipitate was filtered and washed with water/methanol (1/1). After drying 10.1 g of compound E were obtained (m.p. 200° C.; decomposition).

EXAMPLE 5

The absorption maxima ($\lambda$max) and molar extinction coefficients ($\epsilon$) of the dyes identified below were determined in methanol. The results are listed in table 3.

TABLE 3

| dye | $\lambda$max (nm) | $\epsilon$ (mol$^{-1}$ cm$^{-1}$ l) |
| --- | --- | --- |
| C1 | 636 | 29615 |
| C2 | 654 | 28469 |
| C3 | 638 | 32109 |
| C4 | 656 | 29665 |
| 1 | 644 | 32096 |
| 2 | 648 | 34251 |
| 25 | 648 | 31152 |
| 29 | 667 | 28805 |
| 30 | 672 | 34216 |
| 19 | 644 | 30264 |
| 39 | 672 | 29068 |
| 38 | 666 | 29845 |
| 74 | 634 | 24721 |
| 3 | 648 | 32389 |
| 22 | 640 | 32175 |
| 36 | 654 | 29118 |
| 40 | 672 | 32101 |
| 4 | 648 | 34349 |
| 81 | 672 | 30125 |
| 66 | 632 | 28697 |
| 67 | 632 | 24146 |
| 61 | 626 | 26854 |
| 82 | 634 | 22857 |

From table 3 it can be seen that the dyes of the present invention generally absorb at longer wavelengths and with higher molar extinction coefficients than the comparison dyes, e.g. compare C1 and dye 2, C2 and dye 30, C3 and dye 2, C4 and dye 30. As a result the dyes according to the invention are more suitable cyan dyes for color printing.

Comparison dyes:

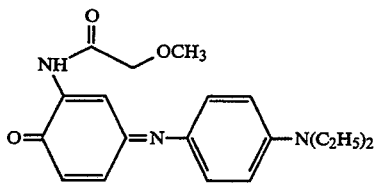

-continued

Comparison dyes:

C2
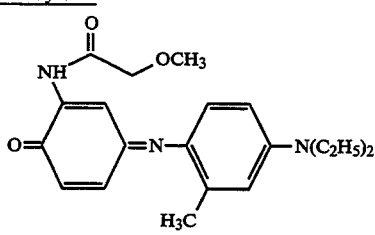

C3
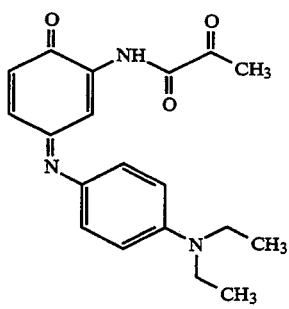

C4
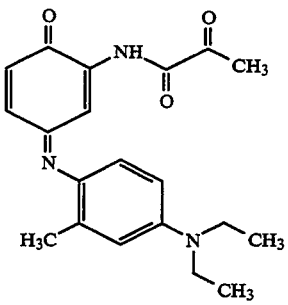

EXAMPLE 6

A dye-donor element for use according to thermal dye sublimation transfer was prepared as follows:

A solution of a-dye, the nature and amount of which is identified in Table 4 below, and 50 mg of co-acrylonitrile-styrene binder in 10 ml of methylethylketone as solvent was prepared. From this solution a layer having a wet thickness of 100 μm was coated on 5 μm polyethylene terephthalate film. The resulting layer was dried by evaporation of the solvent.

Receiver sheets were prepared by coating a subbed polyethylene terephthalate film having a thickness of 175 μm with a dye-image receiving layer from a solution in ethyl methyl ketone of 3.6 g/m² of poly(vinyl chloride/co-vinyl acetate/co-vinyl alcohol) (Vinylite VAGD supplied by Union Carbide), 0.336 g/m² of diisocyanate (DESMODUR VL supplied by Bayer AG), and 0.2 g/m² of hydroxy modified polydimethylsiloxane (Tegomer H SI 2111 supplied by Goldschmidt).

The dye-donor element was printed in combination with a receiving sheet as described above in a color video printer supplied by MITSUBISHI, type CP 100 E.

The receiver sheet was separated from the dye-donor element and the maximum color density of the recorded dye image on the receiving sheet ($D_{max}$) was measured by means of a Macbeth TR 924 densitometer.

The results are listed in Table 4 below.

TABLE 4

| dye | mg | density (transmission) |
|---|---|---|
| 2 | 50 | 1.71 |
| 39 | 50 | 1.02 |
| 25 | 50 | 1.32 |
| 74 | 50 | 1.52 |
| 30 | 50 | 1.13 |
| 22 | 50 | 1.08 |
| 36 | 50 | 0.83 |
| 40 | 50 | 1.27 |
| 3 | 50 | 1.58 |
| 81 | 50 | 1.15 |
| 66 | 50 | 1.58 |
| 67 | 50 | 1.53 |
| 1 | 30 | 0.75 |
| 29 | 30 | 0.54 |
| 4 | 50 | 1.47 |
| 61 | 50 | 1.17 |
| 19 | 50 | 1.66 |
| 50 | 50 | 1.19 |

EXAMPLE 7

Receiver sheets were prepared as described in Example 6.

Black dye-donor elements were prepared as follows:

The amounts of dyes as indicated in the following Table 5 were added each time to 10 ml of a solution of 0.5% by weight of poly(styrene-co-acrylonitrile) (Luran 388S, supplied by BASF Germany) in ethyl methyl ketone. The resulting black-coloured dye mixtures were coated, printed, and evaluated as described in the above Example 6.

The results of the tests are listed in the following Table 5.

The prior art dyes C-magenta, and C-yellow having the following structural formulae were used in combination with a cyan dye according to the invention.

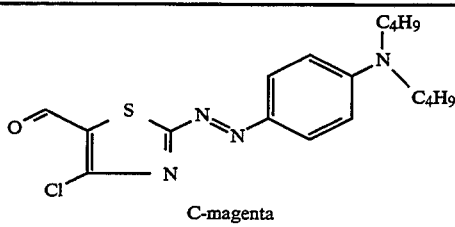

C-magenta

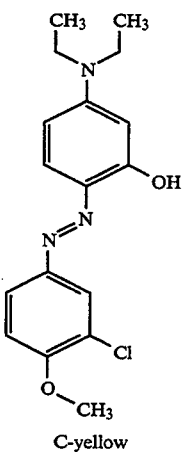

C-yellow

| No. | Dyes | Amount (mg) | Red | Green | Blue | Visual |
|---|---|---|---|---|---|---|
| 1 | 1 | 30 | 2.57 | 2.07 | 1.61 | 2.25 |
|  | C-magenta | 50 | | | | |
|  | C-yellow | 30 | | | | |
| 2 | 29 | 30 | 2.01 | 1.72 | 1.43 | 1.90 |
|  | C-magenta | 50 | | | | |
|  | C-yellow | 30 | | | | |
| 3 | 2 | 30 | 2.49 | 1.89 | 1.50 | 2.10 |
|  | C-magenta | 50 | | | | |
|  | C-yellow | 30 | | | | |
| 4 | 39 | 30 | 2.31 | 1.86 | 1.54 | 2.08 |
|  | C-magenta | 50 | | | | |
|  | C-yellow | 30 | | | | |
| 5 | 25 | 30 | 2.43 | 1.89 | 1.51 | 2.09 |
|  | C-magenta | 50 | | | | |
|  | C-yellow | 30 | | | | |
| 6 | 74 | 30 | 2.40 | 2.09 | 1.47 | 2.08 |
|  | C-magenta | 50 | | | | |
|  | C-yellow | 30 | | | | |
| 7 | 30 | 30 | 2.43 | 1.94 | 1.62 | 2.17 |
|  | C-magenta | 50 | | | | |
|  | C-yellow | 30 | | | | |
| 8 | 3 | 30 | 2.58 | 2.02 | 2.14 | 2.27 |
|  | C-magenta | 50 | | | | |
|  | C-yellow | 30 | | | | |
| 9 | 81 | 30 | 2.33 | 1.91 | 2.13 | 2.17 |
|  | C-magenta | 50 | | | | |
|  | C-yellow | 30 | | | | |
| 10 | 22 | 30 | 2.16 | 1.77 | 1.86 | 1.99 |
|  | C-magenta | 50 | | | | |
|  | C-yellow | 30 | | | | |
| 11 | 36 | 30 | 2.15 | 1.83 | 2.03 | 2.06 |
|  | C-magenta | 50 | | | | |
|  | C-yellow | 30 | | | | |
| 12 | 40 | 30 | 2.16 | 1.76 | 1.87 | 2.01 |
|  | C-magenta | 50 | | | | |
|  | C-yellow | 30 | | | | |
| 13 | 67 | 30 | 2.51 | 2.11 | 2.13 | 2.28 |
|  | C-magenta | 50 | | | | |
|  | C-yellow | 30 | | | | |
| 14 | 66 | 30 | 2.67 | 2.19 | 2.05 | 2.36 |
|  | C-magenta | 50 | | | | |
|  | C-yellow | 30 | | | | |
| 15 | 19 | 30 | 2.80 | 2.20 | 1.65 | 2.35 |
|  | C-magenta | 50 | | | | |
|  | C-yellow | 30 | | | | |
| 16 | 38 | 30 | 2.85 | 2.24 | 1.75 | 2.44 |
|  | C-magenta | 50 | | | | |
|  | C-yellow | 30 | | | | |

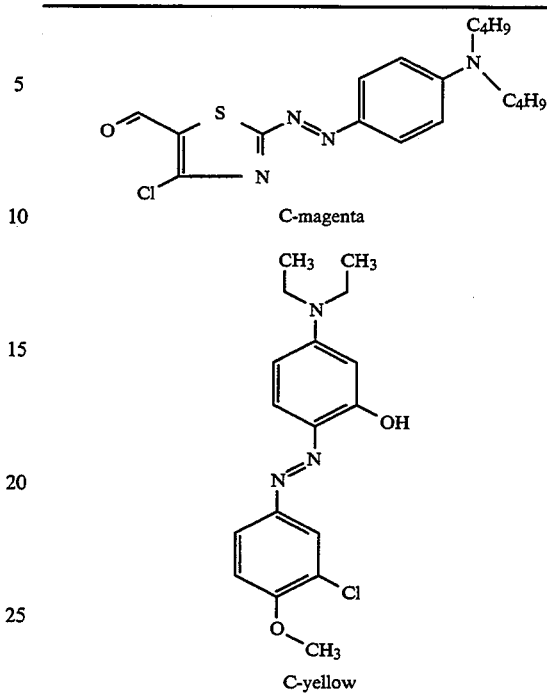

The results listed in Table 5 show that by means of dye-donor elements incorporating a dye mixture comprising a cyan dye according to the present invention transferred black dye images of high density can be made.

EXAMPLE 8

The melting points and the solubility in an ecologically acceptable solvent, e.g. 2-butanone, at room temperature of the corresponding pyruvylamide dyes C3 and C4 are given in table 6.

TABLE 6

| Dye | Solubility[a] | Melting Point (°C.)[b] |
|---|---|---|
| C3 | 0.75% | 163 |
| C4 | 2% | 126 |
| 2 | 2% | 136 |
| 30 | 13% | 110 | a. at room temperature in 2-butanone
b. determined on a Kofler hot stage

From Table 6 it can be seen that the dyes of the present invention have a higher solubility in an ecologically acceptable organic solvent, such as 2-butanone, and lower melting points (C3 vs 2; C4 vs 30) than the corresponding pyruvylamide dyes. Because of their low solubility the pyruvylamide dyes C3 and C4 crystallize in a dye donor material, especially when high amounts of dye are used in the donor sheet in order to obtain high densities.

I claim:

1. Dye-donor element for use according to thermal dye sublimation transfer, said dye-donor element comprising a support provided with a dye layer containing a dye and a polymeric binder, characterized in that said dye corresponds to the following formula (I):

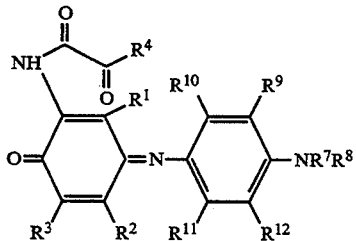

wherein:

$R^1$, $R^2$ and $R^3$ each independently represents hydrogen, halogen, nitro, an alkyl group, a cycloalkyl group, an aryl group, an allyl group, an alkoxy group, an aryloxy group, an alkylthio group, an arylthio group, an acylamino group, an amino group, CN, a carboalkoxy group, a sulfonylamino group, a carbonamido group, which groups may be substituted, or $R^2$ and $R^3$ together with the atoms to which they are attached represent the necessary atoms to form a ring;

$R^4$ represents $OR^5$, $SR^5$, $NR^5R^6$ or a heterocyclic ring;

$R^5$ and $R^6$ each independently represents hydrogen, an alkyl group, an allyl group, an aryl group, a cycloalkyl group, an alkenyl group, a heterocyclic ring or $R^5$ and $R^6$ together with the atoms to which they are attached represent the necessary atoms to form a heterocyclic ring;

$R^7$ and $R^8$ each independently represents hydrogen, an alkyl group, an aryl group, a heterocyclic group, or $R^7$ and $R^8$ together with the atoms to which they are attached represent the necessary atoms to form a heterocyclic ring, or $R^7$ or $R^8$ together with $R^9$ or $R^{12}$ together with the atoms to which they are attached represent the necessary atoms to form a ring;

$R^9$, $R^{10}$, $R^{11}$ and $R^{12}$ each independently represents hydrogen, hydroxy, halogen, an alkyl group, a cycloalkyl group, an aryl group, an amino group, an alkyloxy group, an aryloxy group, a carbamoyl group, a sulfamoyl group, $NH-SO_2R^{13}$, $NH-COR^{13}$, $O-SO_2R^{13}$, $O-COR^{13}$, or $R^9$ and $R^{10}$ or $R^{11}$ and $R^{12}$ together with the atoms to which they are attached represent the necessary atoms to form a ring;

$R^{13}$ represents an alkyl group, a cycloalkyl group, an alkenyl group, an aralkyl group, an aryl group, an alkyloxy group, an aryloxy group, an alkylthio group, an arylthio group, an amino group or a heterocyclic group.

2. A dye-donor element according to claim 1 further containing in said dye layer a yellow and a magenta dye rendering said dye layer black.

3. A method for making an image according to the thermal dye transfer process comprising the steps of:
  placing the dye layer of a dye donor element as defined in any of claims 1 or 2 in face-to-face relationship with an dye-image receiving layer of a receiver sheet;
  image-wise heating a thus obtained assemblage and separating said receiver sheet from said dye donor element.

4. An assemblage comprising (i) a dye donor element having on a support a dye layer containing a dye and a polymeric binder and (ii) a receiver sheet for use in combination with said dye donor element characterized in that said dye is a dye as defined in claim 1.

5. An assemblage according to claim 4 wherein said dye-donor element further contains in said dye layer a yellow and a magenta dye rendering said dye layer black.

* * * * *

UNITED STATES PATENT AND TRADEMARK OFFICE
CERTIFICATE OF CORRECTION

PATENT NO. : 5,391,536
DATED : February 21, 1995
INVENTOR(S) : Luc Vanmaele

It is certified that error appears in the above-indentified patent and that said Letters Patent is hereby corrected as shown below:

Column 4, line 8, "akoxy" should read --alkoxy--;

Column 5, 3rd from bottom line, (Dye 43), "R" should read --H--;

Column 7, Dye 57, "H" (first occurrence) should read --NHAc--;

Column 7, Dye 58, "NHAC" should read --$OCH_3$--;

Column 7, Dye 59, "$OCH_3$" should read --H--;

Column 11, line 66, "acrlate-grafted" should read --acrylate-grafted--;

Column 14, line 25, "$\geq 40°C.$" should read --$\leq 40°C.$--

Column 17, line 42, "a-dye" should read --a dye--;

Column 20, delete lines 1 through 28 (duplication of those lines in Column 19).

Signed and Sealed this

Eighteenth Day of July, 1995

*Attest:*

BRUCE LEHMAN

*Attesting Officer*     *Commissioner of Patents and Trademarks*